(12) United States Patent
Wootten et al.

(10) Patent No.: US 8,622,180 B2
(45) Date of Patent: Jan. 7, 2014

(54) METHODS AND APPARATUS FOR VARIABLE DAMPING ADJUSTER

(75) Inventors: Dennis K. Wootten, Scotts Valley, CA (US); Bryan Wesley Anderson, Watsonville, CA (US); Josh Yablon, Santa Clara, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 250 days.

(21) Appl. No.: 13/010,678

(22) Filed: Jan. 20, 2011

(65) Prior Publication Data

US 2011/0174582 A1    Jul. 21, 2011

Related U.S. Application Data

(60) Provisional application No. 61/296,874, filed on Jan. 20, 2010.

(51) Int. Cl.
*F16F 9/44* (2006.01)

(52) U.S. Cl.
USPC ............. 188/278; 188/319.1; 188/319.2; 188/285; 267/64.18; 267/64.26; 74/527

(58) Field of Classification Search
USPC ............. 188/266, 278, 281, 285, 297, 319.1, 188/319.2; 267/64.18, 64.26; 280/276; 74/527, 526
See application file for complete search history.

(56) References Cited

U.S. PATENT DOCUMENTS

| | | | | |
|---|---|---|---|---|
| 3,848,710 A * | 11/1974 | Thompson et al. | ............ | 188/280 |
| 4,194,412 A * | 3/1980 | Boyer | ............ | 74/554 |
| 4,337,850 A * | 7/1982 | Shimokura | ............ | 188/282.9 |
| 4,476,967 A * | 10/1984 | Tetsuo | ............ | 188/282.5 |
| 6,279,703 B1 * | 8/2001 | Mete | ............ | 188/319.1 |
| 6,360,857 B1 * | 3/2002 | Fox et al. | ............ | 188/281 |
| 6,491,146 B1 * | 12/2002 | Yi et al. | ............ | 188/319.2 |
| 7,147,207 B2 * | 12/2006 | Jordan et al. | ............ | 251/263 |
| 7,703,585 B2 * | 4/2010 | Fox | ............ | 188/299.1 |
| 7,722,069 B2 * | 5/2010 | Shirai | ............ | 280/276 |
| 7,913,823 B2 * | 3/2011 | Murakami | ............ | 188/314 |
| 8,256,787 B2 * | 9/2012 | Inoue et al. | ............ | 280/276 |

* cited by examiner

*Primary Examiner* — Thomas J Williams
*Assistant Examiner* — Mariano Sy
(74) *Attorney, Agent, or Firm* — Patterson & Sheridan, L.L.P.; David M. Haugen

(57) ABSTRACT

Methods and apparatus for a damper adjustment assembly that comprises an adjuster having a first detent at a first axial location, and a second detent at a second axial location. The assembly may further comprise a housing having a keeper for engaging the first and second detents. The method may comprise rotating the adjuster within the housing, and engaging the keeper with the first detent at the first axial location. The method may further comprise further rotating the damping adjuster within the housing and engaging the keeper with the second detent at the second axial location on the adjuster.

16 Claims, 4 Drawing Sheets

METHODS AND APPARATUS FOR VARIABLE DAMPING ADJUSTER

CROSS-REFERENCE TO RELATED APPLICATIONS

This application claims benefit of U.S. provisional patent application Ser. No. 61/296,874, filed Jan. 20, 2010, which is herein incorporated by reference in its entirety.

BACKGROUND

1. Field of the Invention

The invention generally relates to methods and apparatus for enhanced resolution of a ball detent type retainer for use with parameter adjustment mechanisms. More specifically, embodiments generally relate to methods and apparatus for use with suspension system dampers. In particular, embodiments relate to a variable damping adjuster for adjusting characteristics of a vehicle suspension system.

2. Description of the Related Art

Many vehicles today have suspension systems that are configured to let the vehicle wheels move up and down to absorb the shock when encountering uneven terrain, while keeping the wheels in contact with the ground. Suspension systems generally contain two elements, a spring and a damper. These two components are sometimes collectively referred to as a shock absorber. In some configurations, the damper alone is referred to as a "shock absorber."

It is often desirable to have a suspension system that is adjustable, so that the operator of the vehicle can have an optimum riding experience on different types of terrain. Since there are numerous types of terrain over which the vehicle may be driven, it may be difficult to provide such a suspension system that can be easily tunable to each environment. Therefore, there is a continuous need for suspension systems that are easily adjustable and can provide an optimum range of shock absorption for any given terrain.

SUMMARY OF THE INVENTION

In one embodiment, a parameter adjuster indexing mechanism having enhanced resolution is provided. In one embodiment, a vehicle suspension damper for providing a variable damping rate may comprise an adjuster having a first detent at a first axial location and a second detent at a second axial location; and a housing having a keeper for engaging the first and second detents.

In one embodiment, an adjustment assembly may comprise a shaft having a first detent disposed at a first axial location on an outer surface of the shaft, and a second detent disposed at a second axial location on the outer surface of the shaft. The assembly may further comprise a retaining member for engaging the first and second detents and a biasing member operable to bias the retaining member into engagement with at least one of the first and second detents.

In one embodiment, a method for altering the damping rate of a vehicle suspension damper may comprise rotating a damping adjuster, within a housing; engaging a keeper with a first detent at a first axial location on the adjuster; further rotating the damping adjuster within the housing; and engaging the keeper with a second detent at a second axial location on the adjuster.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
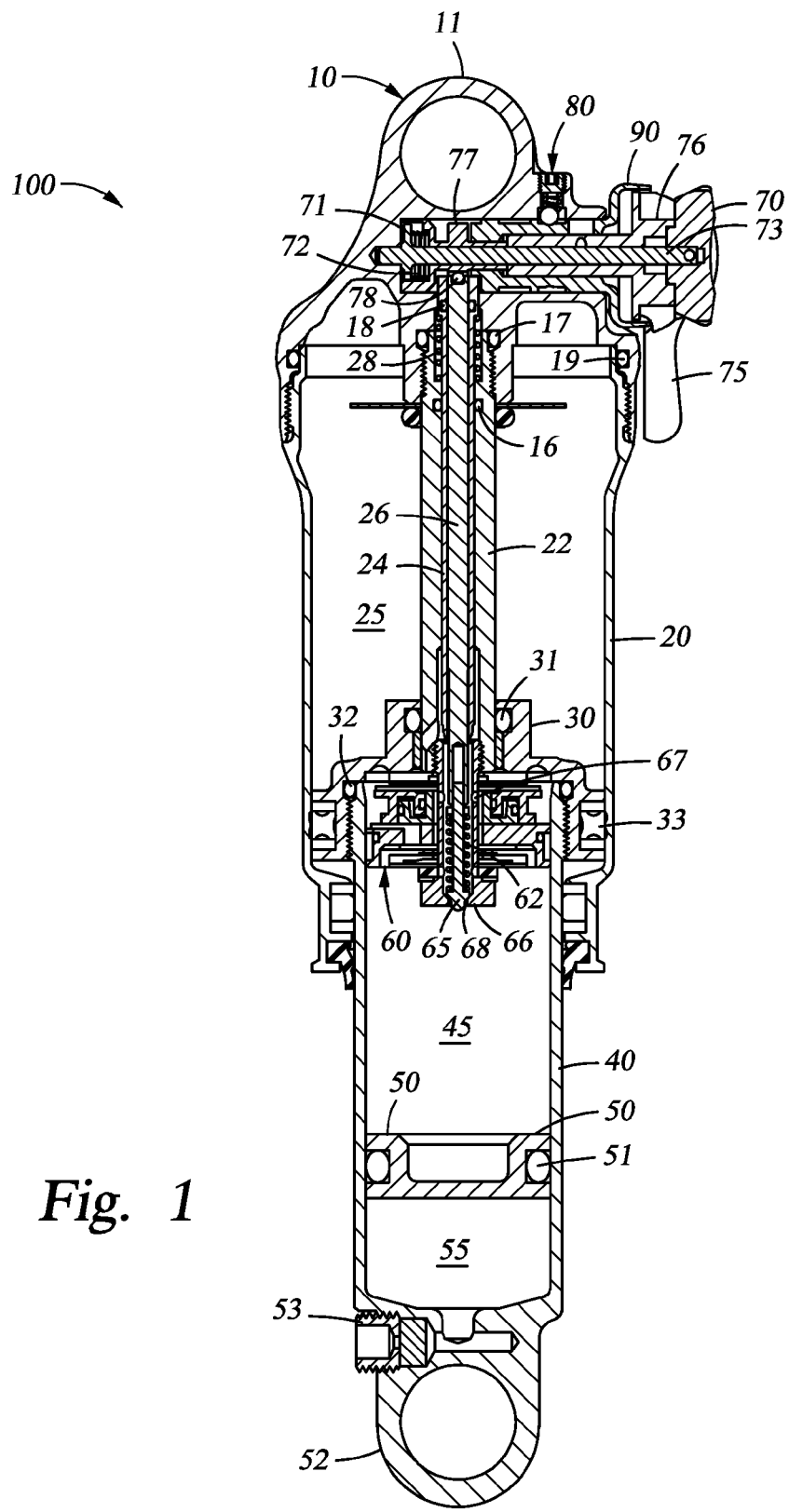
FIG. 1 illustrates a cross-sectional view of a shock absorber according to one embodiment.

The embodiments described herein may be used with the embodiments described in U.S. Provisional Patent Application Ser. No. 61/083,478, filed Jul. 24, 2008, and U.S. patent application Ser. No. 12/509,258, filed Jul. 24, 2009, and each of those applications is herein incorporated by reference in its entirety.

One embodiment hereof comprises an adjuster for a vehicle shock absorber damper. In one embodiment the vehicle is a bicycle. The shock absorber is advantageous because it includes a damper having a manually adjustable damping resistance. In one embodiment, the manually adjustable damping function allows a user to adjust a "platform" or "blow off" threshold which must be exceeded before the shock absorber can experience significant compression travel. It allows the user to establish a level, in one embodiment, for compression damping whereby such damping is increased or decreased selectively. A bicycle rider for example may choose to set a fairly high threshold for the function of compression damping thereby reducing pedal induced suspension bob. In one embodiment the adjuster is for a bicycle or motorcycle fork.

U.S. Pat. No. 6,135,434, which patent is herein incorporated by reference in its entirety, shows certain variations of positive and negative spring mechanisms. Another selectively variable damping mechanism is shown in U.S. Pat. No. 6,360,857, which patent is herein incorporated by reference in its entirety. Optionally, any of the foregoing mechanisms may be integrated, or used in combination, with any other features disclosed herein.

U.S. Pat. Nos. 6,415,895, 6,296,092, 6,978,872 and 7,308,976, each of which patents is herein incorporated by reference in its entirety, show certain variations of position sensitive damping mechanisms. Another position sensitive damping mechanism is shown in U.S. Pat. No. 7,374,028, which patent is herein incorporated by reference in its entirety. Another position sensitive damping mechanism is shown in U.S. Pat. No. 5,190,126, which patent is herein incorporated by reference in its entirety. Optionally, any of the foregoing mechanisms may be integrated, or used in combination, with any other features disclosed herein.

U.S. Pat. Nos. 6,581,948, 7,273,137, 7,261,194, 7,128,192, and 6,604,751, each of which patents is herein incorporated by reference in its entirety, show certain variations of inertia valve mechanisms for controlling aspects of compression damping. Additionally, U.S. Published Patent Application Nos. 2008/0053768 A1, 2008/0053767 A1, 2008/0035439 A1, 200810007017 A1, 2007/0296163 A1, 2007/0262555 A1, 2007/0228691A1, 2007/0228690 A1, 2007/0227845 A1, 2007/0227844 A1, 2007/0158927 A1, 2007/0119670 A1, 2007/0068751A1, 2007/0012531A1, 2006/0065496 A1, each of which patent applications is herein incorporated by reference in its entirety, show certain variations of inertia valve mechanisms for controlling aspects of compression damping. Optionally, any of the foregoing inertia valve mechanisms or other features may be integrated, or used in combination, with any other features disclosed herein. A shock absorber or fork may be equipped, for example, with an inertia valve for controlling an aspect of damping and a position sensitive valve for controlling another aspect of damping.

In one embodiment, both compression and rebound damping are selectively adjustable by the user. Optionally, any of the features described herein may be adapted for integration into a bicycle or motorcycle fork. For example, FIGS. 14 through 25, of U.S. Pat. No. 7,273,137 (incorporated herein by reference) show an embodiment of a vehicle suspension fork that may be integrated with features hereof. Additionally, U.S. Pat. No. 6,592,136, which patent is herein incorporated by reference in its entirety, shows embodiments of a vehicle suspension fork that may be integrated with features hereof. Additionally, Published U.S. Patent Applications 2007/0119672 A1 and 2007/0007743 A1, each of which applications is herein incorporated by reference in its entirety, show embodiments of a vehicle suspension fork that may be integrated with features hereof.

Figure 2:
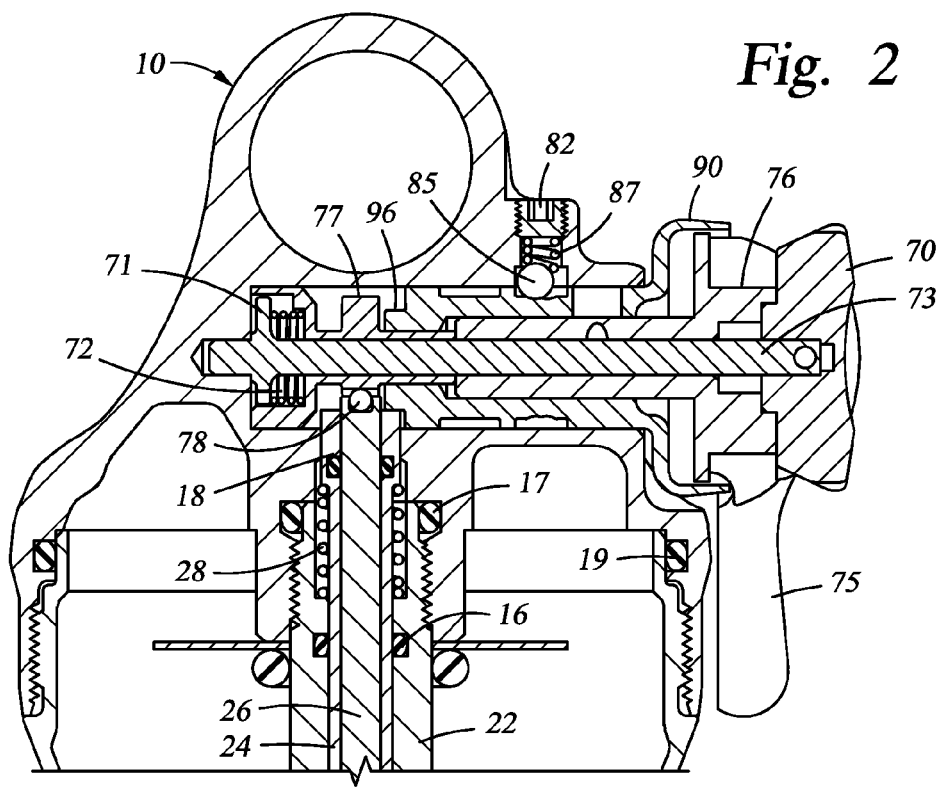
FIGS. 2 and 3 illustrate a blown-up cross-sectional view of a housing assembly of the shock absorber according to one embodiment.
Figure 3:
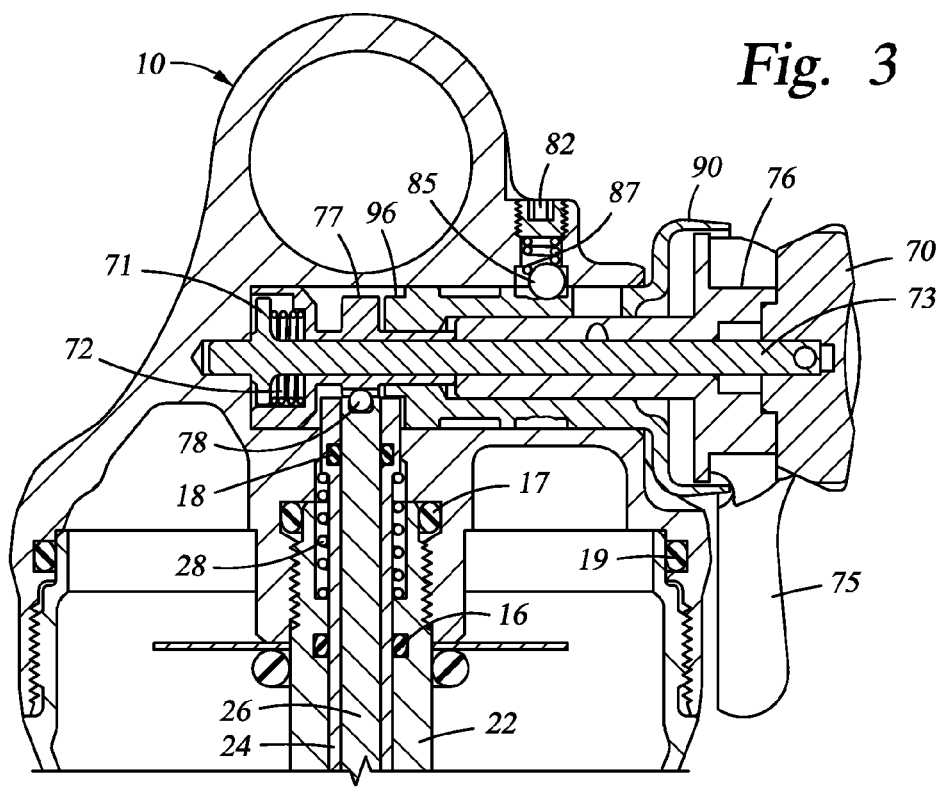

FIGS. 1, 2, and 3 illustrate an embodiment of a shock absorber 100 and a housing assembly 10 which includes a damper adjuster assembly, generally described herein as a rebound metering cam shaft 90. Although described herein with respect to a rebound metering cam shaft, the embodiments of the damper adjuster assembly may be used with any other components of a shock absorber system. In addition, although described herein with respect to a shock absorber system, the embodiments of the damper adjuster assembly may be used with any systems having or needing an adjuster-type feature and/or a damper adjuster-type feature. In one embodiment, the shock absorber 100 may be configured with a variable gas spring system and/or a mechanical spring system. U.S. Pat. No. 6,360,857, which patent is entirely incorporated herein by reference, shows an embodiment of an adjuster assembly with which the present improvements may be used.

FIG. 1 shows an embodiment of the shock absorber 100. The shock absorber 100 includes the housing assembly 10, and a body 40 slidably (axially) disposed in a sleeve assembly 20. The sleeve assembly 20 is connected, by helical threads, to the housing assembly 10 and forms a seal therewith by a seal 19. A bearing assembly 30 is connected to an end of the body 40 by threads and is fluid sealed in relation thereto by a seal 32, and is also fluid sealed to shaft 22 via seal 31 and sleeve assembly 20 via seal 33. An inner compression rod 26 is disposed approximately concentrically within a rebound metering rod 24, and a seal 18 is provided therebetween. The rods 26, 24 are disposed approximately concentrically within a shaft 22, and a seal 16 is also provided between the rod 24 and the shaft 22. The shaft 22 is threaded at a first end in sealing engagement, via seal 17, into housing assembly 10. A piston assembly 60 is threaded into a second end of the shaft 22 by means of a piston bolt 66. A floating piston assembly 50 and a seal 51 (e.g. "a movable barrier") are disposed within and axially movable in relation to the body 40. The floating piston assembly 50 divides an interior of the body 40 into a damping fluid chamber 45 and a compressible chamber 55. A plug member 53 may be used to open and close a fluid port to fill the compressible chamber 55. Eyelets 11 and 52 may be formed at the ends of the shock absorber for connection to a vehicle. A spring chamber 25 is formed by the housing assembly 10, the sleeve assembly 20, and the bearing assembly 30. In one embodiment, an example of a shock absorber 100 that may be used with the embodiments described herein is provided in U.S. Provisional Patent Application Ser. No. 61/083,478, filed Jul. 24, 2008, and U.S. patent application Ser. No. 12/509,258, filed Jul. 24, 2009, each of which applications is herein incorporated by reference in its entirety.

In operation, an axial compressive force exerted on the shock absorber 100 causes the body 40 and attached bearing assembly 30 to move axially further into the interior of the sleeve assembly 20. In so moving, the body 40 and the bearing assembly 30 also move axially relative to the piston assembly 60, the shaft 22, the rods 24, 26, and the housing assembly 10. During that movement, gas in the spring chamber 25 is compressed and thereby stores energy for release during rebound. Compression damping occurs as damping fluid in the damping fluid chamber 45 is forced to move from a first side of the piston assembly 60 to a second side of the piston assembly 60 through one or more flow paths, typically disposed through the piston assembly 60 and having varying degrees of designed resistance to flow through. Rebound damping occurs as the damping fluid then returns from the second side of the piston assembly 60 to the first side through one or more flow paths, typically disposed through the piston assembly 60 and having varying degrees of designed resistance to flow through.

In one embodiment, the piston assembly 60 determines the operational fluid flow paths through which the damping fluid may flow and thereby dictates the degree of damping available. In one embodiment, the piston assembly 60 is configured so that certain fluid flow paths are open for compression damping and certain other flow paths are open for rebound damping, thereby allowing for differing degrees of damping during shock compression versus shock rebound. In one embodiment, an example of a piston assembly 60 that may be used with the embodiments described herein is provided in U.S. Provisional Patent Application Ser. No. 61/083,478, filed Jul. 24, 2008, and U.S. patent application Ser. No. 12/509,258, filed Jul. 24, 2009, each of which applications is herein incorporated by reference in its entirety.

As the body 40 moves further into the sleeve assembly 20 during compression, the shaft 22 further enters the volume of the damping fluid chamber 45 and occupies and thereby reduces available fluid volume therein. In one embodiment, the compressible chamber 55 is filled with a compressible fluid such as a gas and/or is preloaded at an elevated pressure. In one embodiment, the damping fluid chamber 45 is filled with a liquid damping fluid that is relatively incompressible. As the shaft 22 enters the damping fluid chamber 45 and reduces the fluid volume therein, the relatively incompressible damping fluid is displaced. The volume of the damping fluid chamber 45 is therefore correspondingly increased to compensate for the reduction, due to the incursion of the shaft 22, by movement of the floating piston assembly 50 such that the gas in the compressible chamber 55 is compressed or further compressed. The floating piston assembly 55 is configured for transferring pressure from the damping fluid chamber 45 to the compressible chamber 55. The floating piston assembly 50 moves to reduce the volume of the compressible chamber 55 (and compressing the fluid therein) while increasing (i.e. compensating) the volume of the damping fluid chamber 45.

In one embodiment, as the shaft 22 moves into the damping fluid chamber 45 and towards the compressible chamber 55, the inner compression rod 26 may be biased at one end by a damping adjustment spring 62, which also biases a damping adjustment valve 65. At the same time, pressure within the damping fluid chamber 45 increases. This increased pressure pushes against the damping adjustment valve 65 against the bias of the damping adjustment spring 62. If the pressure overcomes the seating force of the damping adjustment valve 65, then an aperture 68 opens up and allows damping fluid to flow through to the opposite side of the piston assembly 60. The damping fluid may flow through one or more channels 67 to the other side of the piston assembly 60. Adjusting the amount of preload on the damping adjustment spring 62 by axially moving the compression rod 26 toward and away from the piston assembly 60, thereby adjusts the damping rate of the shock absorber 100.

In one embodiment, as the shaft 22 moves out of the damping fluid chamber 45 and away from the compressible chamber 55, a rebound metering spring 28 is pushing the rebound metering rod 24 away from the piston assembly 60. The rebound metering spring 28 is disposed between an inner shoulder of the shaft 22 and an outer shoulder of the rebound metering rod 24. At the same time, the rebound metering rod 24 and the piston assembly 60 allow the damping fluid to flow from the opposite side of the piston assembly 60 back into the damping fluid chamber 45. The damping fluid may flow through one or more channels that are metered by the rebound metering rod 24 depending on its axial position relative to the piston assembly 60. Adjusting the axial position of the rebound metering rod 24, e.g. moving the rebound metering rod 24 toward and away from the piston assembly 60, thereby adjusts the rebound rate of the shock absorber 100. For example, when the rebound metering rod 24 is in a first position relative to the piston assembly 60, the rebound damping fluid may flow more freely from above the piston assembly 60 to below the piston assembly 60 during extension of the body 40 from the sleeve assembly 20. Therefore the shock absorber 100 extends more rapidly. And when the rebound metering rod 24 is moved axially to a second position, the rebound damping fluid may flow less freely from above the piston assembly 60 to below the piston assembly 60. Therefore the shock absorber 100 extends more slowly.

The axial positions of the rebound metering rod 24 and the compression rod 26 may be selectively adjusted by rotation of a first damper adjuster, such as a rebound metering cam shaft 90, and a second damper adjuster, such as a compression cam shaft 76, respectively, that are each rotatably mounted within a recess 71 of the housing assembly 10. The compression cam shaft 76 may include one or more lobes 77 of varying height that engage an upper end of the compression rod 26 via a ball member 78 to axially move the compression rod 26 toward and away from the damping adjustment spring 62. Rotation of compression cam shaft 76 moves the lobes 77 into engagement with the compression rod 26 to cause axial displacement thereof and correspondingly alter the damper adjustment spring 26 preload to adjust damping rates. A connecting rod 73 may be disposed through the compression cam shaft 76, and may engage a spring 72 disposed within an end of the compression cam shaft 76 at one end and coupled to a knob 70 at the opposite end. A lever 75 may also be coupled to the compression cam shaft 76.

Similarly, the rebound metering cam shaft 90 may include a varying outer diameter surface 96 that engages an upper end of the rebound metering rod 24 to axially move the rod 24 toward and away from the piston assembly 60 against the bias of the rebound metering spring 28. Rotation of the rebound metering cam shaft 90 causes rotation of the outer diameter surface 96, which surface abuts a portion of an upper end of the rebound metering rod 24, and corresponding axial movement of the rebound metering rod 24. Axial movement of the rod 24 allows or obstructs rebound damping fluid flow through the piston assembly 60. A ball and spring assembly 80 may be disposed within the housing assembly 10 to engage one or more detents that are formed on the outer surface of the rebound metering cam shaft 90. The ball and detent mechanism as further discussed below is configured to assist with selective adjustment and maintenance of the axial position of the rebound metering rod 24 by rotation of the rebound metering cam shaft 90.

FIGS. 2 and 3 illustrate a first and second axial position of the rebound metering rod 24 corresponding to contact with the varying outer "diameter" surface 96 of the rebound metering cam shaft 90. The rotational position of the rebound metering cam shaft 90 is supported by a retaining member or a keeper, such as ball 85, that is biased by a spring 87 into engagement with one or more small recesses or "detents" 92, 93 disposed in an annular recess 91 on the outer surface of the rebound metering cam shaft 90 (illustrated in FIG. 4). The ball 85 and spring 87 are held within the housing assembly 10 by a support member 82.

In one embodiment the ball 85, the spring 87, and the detents 92, 93 can be used to form an incremental adjuster to control resolution of rotation of the rebound metering cam shaft 90 and thus the axial displacement of the rebound metering rod 24. As a knob portion of the shaft 90 is turned, there is a noticeable (to the user by "clicking" feel for example) detent engagement and the shaft 90 is held in rotational position by the ball engaged detent. The knob portion of the shaft 90 may be positioned adjacent to the knob 70 for ease of access and operation and is rotatable relative to the housing assembly 10. The knob portion, in the shown embodiment, is formed integrally with the rebound metering cam shaft 90, but may be formed as a separate member that is coupled to the shaft in other embodiments.

Figure 4:
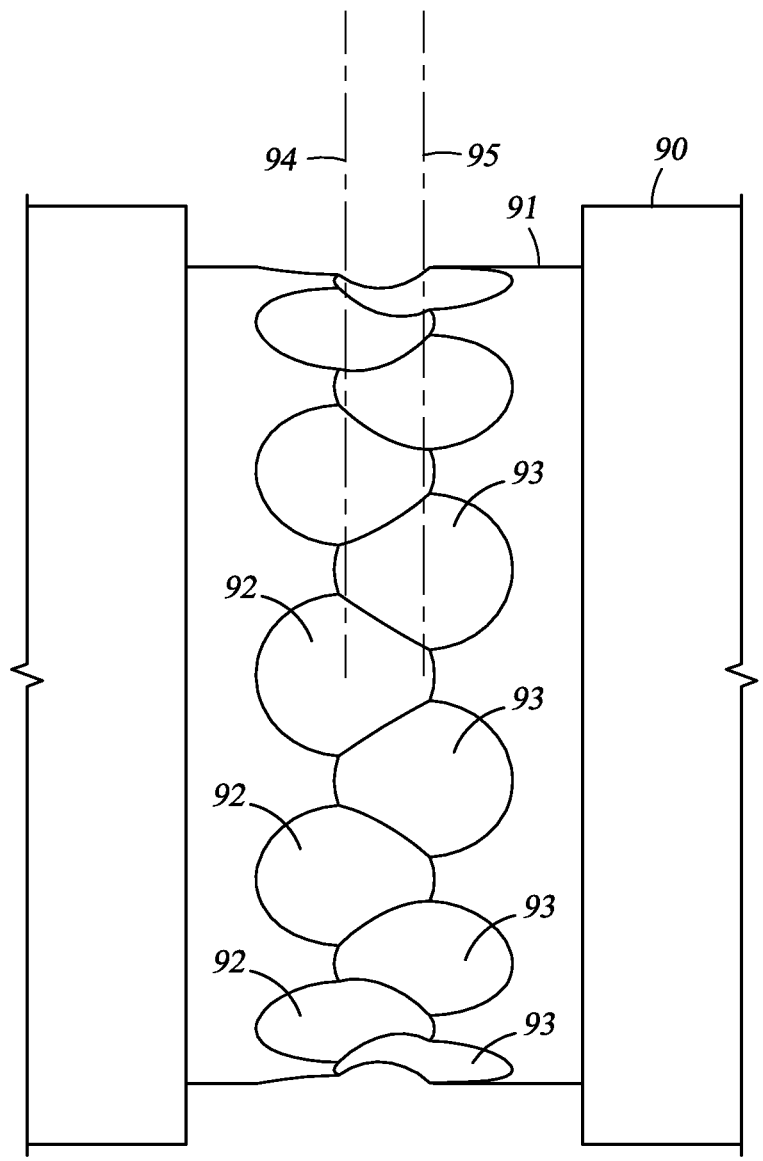
FIG. 4 illustrates an adjustment shaft and detent mechanism of the shock absorber according to one embodiment.

In general, for a given diameter ball and detent depth the number of detent positions at any one axially located circumference is limited by the diameter of the adjuster. In order to increase the number of potential detent positions and hence the adjuster resolution, the shaft 90 is provided with a first row or set of detents 92 and a second row or set of detents 93, as illustrated in FIG. 4. The second row of detents 93 is offset axially from the first row of detents 92, and is also shifted by half of the rotational angle between same row detents. This pattern creates a "zig-zag" path for the ball 85 to follow as the cam shaft 90 is rotated. The geometry of the detents may be adjusted so that the detents 92, 93 intersect and share a portion of their outer boundary. In one embodiment, the ball 85 may move from one detent 92 to an adjacent detent 93 through the intersection formed between the detents 92, 93.

As shown in FIGS. 5, 6, 7, and 8, the detents 92, 93 or other suitable recesses/depressions (or protrusions to interface with a cup instead of the shown ball 85) are situated at locations circumferentially around the shaft 90. The detents 92, 93 engage with the ball and spring assembly 80 that operates to axially impinge the ball 85 into the detents 92, 93 as the detents pass under the ball 85 during rotation of the shaft 90. As the shaft 90 is rotated, the ball 85 alternatingly plunges into the passing detents 92, 93 and is pushed out by compression of the spring 87 as the detent passes by. Subsequently, the ball 85 will plunge into the next sequentially passing detent.

Such engagement of the ball 85 with the detents 92, 93 creates a "resolution" that can be felt when turning the knob portion of the shaft 90, whereby the knob portion will tend to come to, and stay in, rest at a ball engaged detent rotational position.

Figure 5:
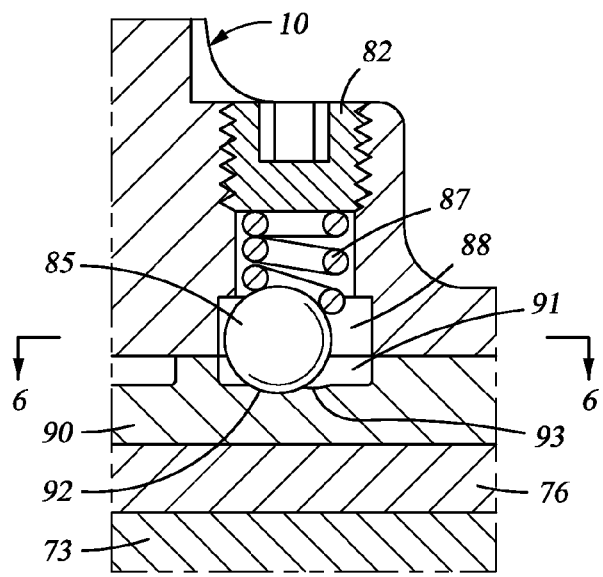
FIG. 5 illustrates the adjustment shaft in a first adjustment position.
Figure 6:
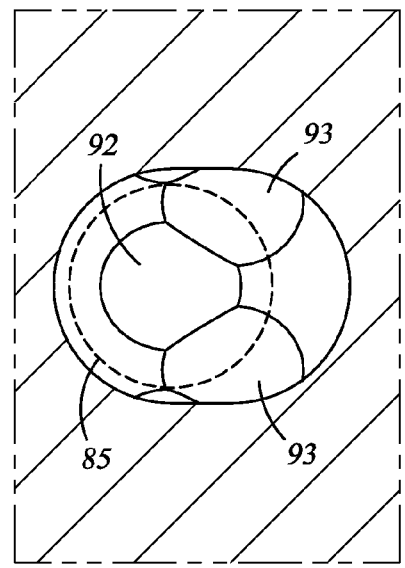
FIG. 6 illustrates a cross-sectional view of the ball and detent mechanism in the first adjustment position.
Figure 7:
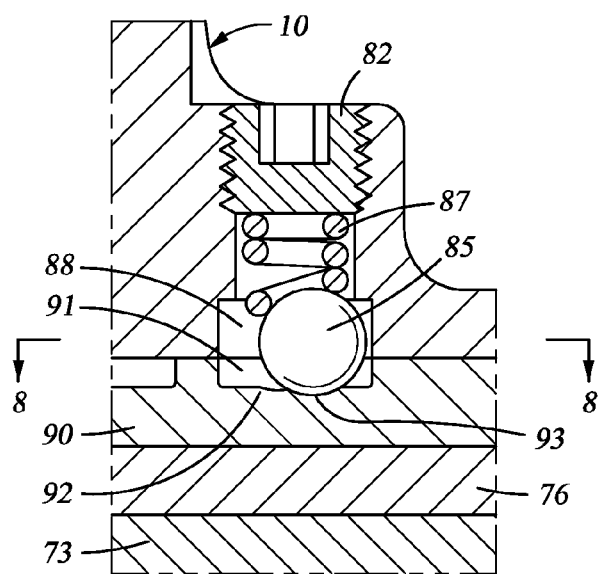
FIG. 7 illustrates the adjustment shaft in a second adjustment position.
Figure 8:
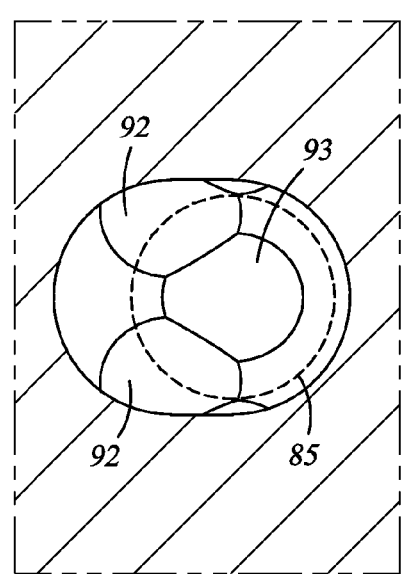
FIG. 8 illustrates a cross-sectional view of the ball and detent mechanism in the second adjustment position.

It follows from the preceding that the fineness of resolution of the shaft 90 depends on the circumferential density of the detents 92, 93 (or protrusions as the case may be). In one embodiment, the ball and spring assembly 80 has some latitude for movement in an axial direction fore to aft, within a recess 88 of the housing assembly 10 (as shown in FIGS. 5 and 7), which is a direction substantially parallel to the axis of the shaft 90. In one embodiment, the detents 92, 93 are positioned in a first circumference 94 about the shaft 90 and also in a second circumference 95 about the shaft 90 such that the first and second circumferences 94, 95 are axially close (within a detent radius, for example). The first and second circumferences 94, 95 may also coincide with the central axes of the respective row of detents 92, 93. As such, there are two "rows" of detents around the shaft 90. In one embodiment, the detents 92, 93 of the rows may be arranged such that the detents 92, 93 as seen on the shaft 90 alternate from one "row" to the next "row" and back again through a shaft rotation. In one embodiment, the ball and spring assembly 80 has latitude to move side to side sufficiently to impress the ball 85 in each alternating detent row as the detents 92, 93 pass under the ball 85. As such, the fineness of shaft 90 resolution is now dependent on the combination of the two rows of detents 92, 93. In one embodiment, there are three detent rows having staggered detents and a ball spring having sufficient latitude to engage all three. In one embodiment the natural "ridge" between adjacent detents is reduced (creating a sort of "detented" zig zag "channel" for example) so that the ball is "guided" in its movement between axially spaced detents.

In this manner, the resolution of the shaft 90 formed by the detent 92, 93 arrangement provides for a more fine tuned adjustment or movement of the varying outer diameter surface 96 of the shaft 90 to incrementally axially displace and retain the rebound metering rod 24, which thereby incrementally adjusts the damping rate of the shock absorber 100. In one embodiment, a shape of the detents 92, 93 may be in the form of partial spherical depressions. Other shapes of detents may be used with the embodiments described herein.

While the foregoing is directed to embodiments of the present invention, other and further embodiments of the invention may be implemented without departing from the scope of the invention, and the scope thereof is determined by the claims that follow.

The invention claimed is:

1. A vehicle suspension damper assembly for providing a variable damping rate comprising:
an adjuster having a first detent at a first axial location and a second detent at a second axial location; and
a housing having a keeper for engaging the first and second detents, wherein the first axial location is spaced from the second axial location a distance that is substantially equal to a radius of at least one of the first and second detents, wherein the first detent forms an intersection with the second detent, and wherein the keeper is movable from the first detent to the second detent through the intersection.

2. The assembly of claim 1, further comprising a biasing member operable to bias the keeper into engagement with the first detent and the second detent.

3. The assembly of claim 2, wherein the biasing member is a spring, and wherein the keeper is a ball.

4. The assembly of claim 1, wherein the adjuster comprises a shaft, and wherein the first and second detents are disposed on an outer surface of the shaft.

5. The assembly of claim 1, wherein the keeper is movable from the first detent to the second detent by rotation of the adjuster.

6. The assembly of claim 1, further comprising a damper rod in contact with a cam surface of the adjuster, wherein rotation of the adjuster moves the damper rod, thereby adjusting the damping rate of the vehicle suspension damper.

7. The assembly of claim 1, wherein the adjuster is rotatable relative to the housing and the keeper.

8. The assembly of claim 1, further comprising a plurality of first detents that are disposed about an outer surface of the adjuster and in axial alignment with the first axial location.

9. The assembly of claim 8, further comprising a plurality of second detents that are disposed about the outer surface of the adjuster and in axial alignment with the second axial location.

10. The assembly of claim 9, wherein the each of the plurality of first detents is partially disposed between at least two of the plurality of second detents.

11. A method for altering the damping rate of a vehicle suspension damper comprising:
rotating a damping adjuster that is disposed within a housing;
engaging a keeper with a first detent at a first axial location on the damping adjuster;
further rotating the damping adjuster within the housing; and
engaging the keeper with a second detent at a second axial location on the damping adjuster, wherein the first detent forms an intersection with the second detent, and further comprising moving the keeper from the first detent to the second detent through the intersection.

12. The method of claim 11, further comprising moving the keeper from the first detent to the second detent by rotating the damping adjuster.

13. The method of claim 11, further comprising biasing the keeper into engagement with the first detent and the second detent with a spring.

14. The method of claim 11, wherein the damping adjuster comprises a shaft, and wherein the first and second detents are disposed on an outer surface of the shaft.

15. The method of claim 11, further comprising moving a damper rod by rotation of the damper adjuster, and thereby adjusting the damping rate of the vehicle suspension damper.

16. The method of claim 11, wherein the first axial location is spaced from the second axial location a distance that is substantially equal to a radius of at least one of the first and second detents.

* * * * *